United States Patent [19]

Woodward et al.

[11] Patent Number: 5,034,879
[45] Date of Patent: Jul. 23, 1991

[54] PROGRAMMABLE DATA PATH WIDTH IN A PROGRAMMABLE UNIT HAVING PLURAL LEVELS OF SUBINSTRUCTION SETS

[75] Inventors: Thomas R. Woodward; David D. McCoach, both of West Chester, Pa.

[73] Assignee: Unisys Corp. (Formerly Burroughs Corp.), Detroit, Mich.

[21] Appl. No.: 262,100

[22] Filed: Oct. 24, 1988

Related U.S. Application Data

[63] Continuation of Ser. No. 129,385, Nov. 24, 1987, abandoned, which is a continuation of Ser. No. 656,247, Oct. 1, 1984, abandoned.

[51] Int. Cl.$^5$ .................... G06F 9/22; G06F 9/302; G06F 9/40
[52] U.S. Cl. ................... 364/200; 364/262.7; 364/262.8
[58] Field of Search .................... 364/200, 900

[56] References Cited

U.S. PATENT DOCUMENTS

| 3,839,705 | 10/1974 | Davis et al. | 364/200 |
| 3,859,636 | 1/1975 | Cook | 364/200 |
| 4,161,784 | 7/1979 | Cushing et al. | 364/200 |
| 4,342,078 | 7/1982 | Tredennick | 364/200 |
| 4,466,055 | 8/1984 | Kinoshita et al. | 364/200 |
| 4,586,130 | 4/1986 | Butts, Jr. et al. | 364/200 |

*Primary Examiner*—Thomas C. Lee
*Assistant Examiner*—Robert B. Harrell
*Attorney, Agent, or Firm*—Nathan Cass; Mark Starr

[57] ABSTRACT

A processor is disclosed having two levels of subinstructions, with the processor data bus being selectable as either a 16 bit or 32 bit wide bus under nanoprogram control.

7 Claims, 10 Drawing Sheets

TYPE I

| 0 | 0 | 0 | 1 | 2 | 3 | 4 | SEQUENCER/NANO ADDR/EXTOP/LITERAL | 43 | 44 | 45 | 46 | 47 | 48 |

B FILE ADDR/PARITY

Fig. 3B

TYPE II

| 0 | 0 | 1 | 0 | 5 | 6 | 7 | 8 | 9 | 10 | LITERAL/SAR VALUE | 42 |

LOAD CONTROL

Fig. 3C

TYPE III

| 0 | 0 | 0 | 4 | NANO INSTRUCTION | 42 |

Fig. 3D

MICRO TYPE: 1, 2, 3, 4
SELECT: 5, 6, 7, 8
CONDITION
 T/F: 9
 LU: 10
 ADJ: 11
 ADJ(PHI): 12, 13, 14, 15
SUCCESSOR
 TRUE: 16, 17, 18
 FALSE: 19, 20, 21

NANO ADDRESS: 22, 23, 24, 25, 26, 27, 28, 29
EXTOP/SAR: 30, 31, 32, 33, 34
LITERAL: 35, 36, 37, 38, 39, 40, 41, 42
B FILE ADDRESS: 43, 44, 45, 46, 47
PARITY: 48

Fig. 4

X-SELECT: 1, 2, 3, 4
Y-SELECT: 5, 6, 7
MASKER OP: 8, 9, 10, 11, 12, 13
ALU OP: 14, 15, 16, 17, 18
BSW OP: 19, 20, 21

A DEST: 22, 23, 24
B INPUT: 25, 26, 27
MAR DEST: 28, 29, 30
OTHER DEST: 31, 32, 33, 34
MISC CONTROL: 35, 34, 37, 38, 39

PROGRAMMABLE DATA PATH WIDTH IN A PROGRAMMABLE UNIT HAVING PLURAL LEVELS OF SUBINSTRUCTION SETS

This is a continuation of co-pending application Ser. No. 07/129,385 filed on Nov. 24, 1987, now abandoned, which is a continuation of co-pending application Ser. No. 656,247 filed on Oct. 1, 1984, now abandoned.

RELATED U.S. PATENT APPLICATIONS

U.S. patent applications directly or indirectly related to the present application are:

Ser. No. 656,547, filed Oct. 1, 1984, now abandoned, by Thomas R. Woodward et al. and entitled "Programmable Unit Having Plural Levels of Subinstruction Sets Where a Portion of the Lower Level is Embedded in the Code Stream of the Upper Level of the Subinstruction Sets".

Ser. No. 646,548, filed Oct. 1, 1984, now U.S. Pat. No. 4,687,284, by Thomas R. Woodward et al. and entitled "Field Isolation Mechanism in a Programmable Unit Having Plural Levels of Subinstruction Sets".

BACKGROUND OF THE INVENTION

FIELD OF THE INVENTION

This invention relates to a programmable unit having plural levels of subinstruction sets and more particularly to such a unit wherein a portion of the lower level instruction set is embedded in the upper level instruction set.

DESCRIPTION OF THE PRIOR ART

The term "microprogram" was first coined by Maurice Wilkes in his paper "The Best Way to Design an Automated Calculating Machine," Report of the Manchester University Computer Inaugural Conference, Manchester, England, July 1951, pp 16-18. This paper described a machine instruction decoder that was, in essence, a diode matrix which served as a read only memory. The machine language instruction was employed as an address to this read only memory and the respective control signals were then read out from the memory and sent to the various functional units of the processor to effect the given operation. Such a machine instruction, sometimes called object code, involved a sequence of steps which required that a number of the sets of control signals be read out of the memory in a sequence to execute the given machine language instruction. Each set of control signals became known as a micro instruction and the machine language instruction is often referred to as a macro instruction.

It was a number of years, however, before Professor Wilkes' idea became practical since most computers required a large number of control signals for each clock period, which meant that the control store, or micro program store, had to contain not only a large number of bits in each micro instruction but also had to contain all of the sequences of micro instructions necessary to execute all of the respective macro instructions. However, core memories or diode memories at that time were too large and bulky, as well as expensive, to be placed inside of the processor as an instruction decoder. Furthermore, the resultant micro instruction fetches from memory were slower than could be obtained from a hardwired logic decoder.

With the advent of commercially available integrated circuits, processors could not only be reduced in size and increased in speed but also memories became cheaper and faster and the first micro program computer to be marketed on a widespread commercial market was introduced by IBM as a series called System/360 (see the Amdahl et al. U.S. Pat. No. 3,400,371). Actually, the micro program memories of some embers of that series were formed of capacitor cards.

In System/360, the micro instructions were a set of control signals which were divided into groups or fields with each group or field being encoded in order to conserve the number of bits required to be stored in micro memory. These fields were then decoded for simultaneous execution of the various units of the processor. In earlier developmental micro programmed processors, the entire micro instruction was encoded in order to save memory space which required that the micro instruction itself had to be decoded to obtain the necessary control signals. The former type of partially encoded control signals into fields became known as horizontal micro instructions while the latter type of micro instructions, which were completely encoded, were called vertical micro instructions. Nevertheless, with either type of micro instruction, a complete sequence of such micro instructions had to be stored for every macro instruction that was to be decoded.

In order to reduce the number of micro instructions that had to be stored, the concept was developed of two levels of control stores where the lower level was required to contain only each unique micro instruction rather than sequences of micro instructions which were redundant. A smaller memory in terms of word or instruction widths was supplied to contain a sequence of encoded micro instructions which served as addresses to corresponding horizontal micro instructions written in the lower level store. Such a system is described in the Faber et al. U.S. Pat. No. 3,983,539. In such a system, the lower level control store could be a read only memory, which is cheaper than a random access memory, while the upper level memory would be a random access memory. To distinguish between the shorter vertical micro instructions in the upper level memory and the longer horizontal micro instructions in the lower level memory, the upper level memory was called the micro memory and the inventors of the Faber patent called the lower level memory a nano memory and the horizontal micro instructions were called nano instructions.

First embodiments of this plural level subinstruction set processor required several hundred integrated circuit chips for implementation since at that time such integrated circuit chips contained only a handfull of logic gates per chip. As integrated circuits were developed with greater packing densities, i.e., more gates per chip, fewer chips were required to build the processor. The earlier chips were referred to as small scale integrated circuits (SSI) while the more densely packed chips became known as medium scale integrated circuits (MSI).

With increasing improvement in integrated circuits to very high packing densities (several thousands of gates per chip), a processor employing the concepts of the Faber patent is now commercially available on a single integrated circuit chip (see, for example, the Tredennick et al. U.S. Pat. No. 4,342,078).

However, even with today's very large scale integrated circuit technology, the size of the nano ROM and the micro RAM in the Tredennick processor is limited, which means that a complete set of all nano instructions, that can be used, must be restricted. It is then an object of the present invention to provide an improved processor employing plural levels of subinstruction sets, i.e., micro instructions and nano instructions.

It is another object of the present invention to provide such an improved processor that can employ a fully expanded set of nano instructions.

It is still a further object of the present invention to provide such a processor with a fully expanded nano instruction set so as to provide greater flexibility and utilize all the capabilities of the processor's functional units.

SUMMARY OF THE INVENTION

In order to accomplish the above-identified objects, the present invention is directed toward a processor for implementation in an integrated circuit chip which processor is driven by two levels of subinstructions, namely micro instructions and nano instructions, the latter of which are encoded groups of control signals (although they need not be encoded) that actually drive the various functional units of the processor. A select group of such nano instructions are stored on the integrated circuit chip in a nano memory, which is addressed by respective micro instructions from a random access micro instruction memory. In the present invention, the micro memory is on a separate integrated circuit chip. In order to limit the size of the nano memory, only a selected group of nano instructions are stored therein with the normal routine nano instructions being supplied as part of the micro instruction code stream. With this reduced nano memory, it is possible to use a data bus in the processor of 32 bits; however, for certain applications, only 16 of these bits may be used, thereby shortening the data path width of the processor. This selection between the 16 bit and the 32 bit data path is under the control of a micro-level instruction source so as to be programmable. Furthermore, the processor can isolate a selected field in a data word during one clock-time under microprogram control.

A feature then of the present invention is a processor having two levels of subinstructions, with the processor data bus being selectable as either a 16 bit or 32 bit wide bus under nanoprogram control.

BRIEF DESCRIPTION OF THE DRAWINGS

The above and other objects, advantages and features of the present invention will become more readily apparent from a review of the following specification when taken in conjunction with the drawings wherein.

GENERAL DESCRIPTION OF THE INVENTION

An implementation of the above-described Faber patent used a small micro instruction width of 16 bits and a larger nano instruction width of 54 bits. Several fields of the nano instruction that were involved in critical path timing of the machine were only available after two cascaded memory accesses. In order to speed up the micro cycle, the time critical fields of the nano instruction of the present invention were moved to the micro instruction and will be further described below. The net effect of these changes is that the micro instruction of the present invention is now 48 bits wide while the nano instruction is 39 bits wide. Furthermore, the nano memory is placed on an integrated circuit chip, or more specifically, along the functional units that comprise the processor. The micro instruction memory is on another integrated circuit chip which is outside of the processor, as was the case in the above-identified Faber patent.

In the present invention, the nano memory is limited to 256 nano instructions to reduce the nano memory size and provide more space for other functional units including a 32 bit wide bus as was described above. In order to provide for additional nano instructions, a new type of micro instruction was defined, which instruction includes a 39 bit field that serves as the nano instruction. This provides for the full general usage of the data paths of the present invention and those nano instructions that are stored in the nano memory are only those required for operations which combine a condition test and/or set, literal load or branch with data path operations.

Figure 1:
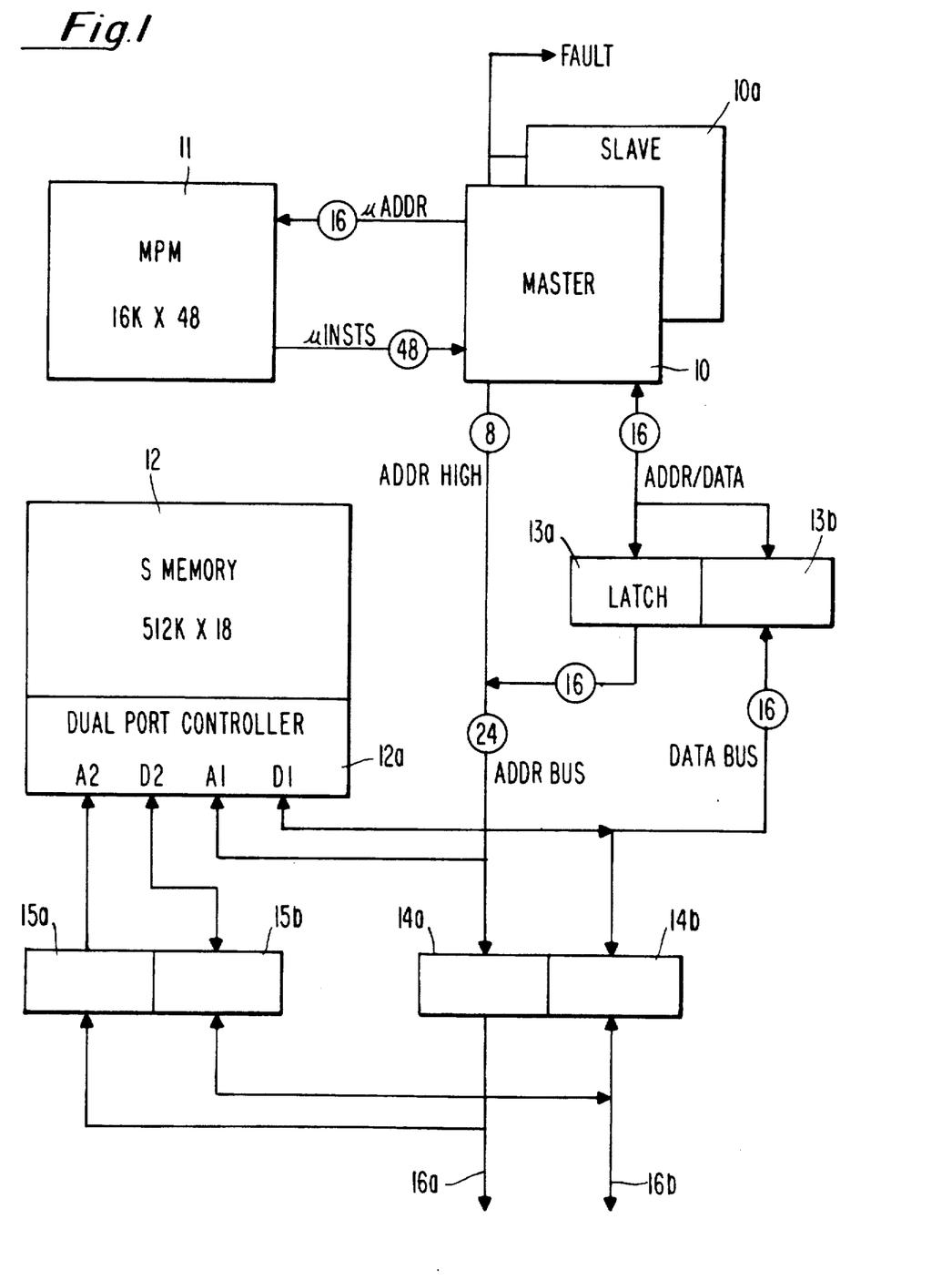
FIG. 1 is a diagram of the system employing the present invention.

A system employing the present invention is shown in FIG. 1, which includes processor 10, which may be a master processor, in which case an identical slave processor 10a is also connected to the address and data buses. The slave processor 10a is used to detect failures in either the master 10 or slave 10a or in their interconnecting wiring. Processor 10 receives machine or "S" instructions and data from S-memory 12 and employs the machine language operators to form an address to micro memory 11 from which it receives micro instructions, as will be more fully described below. Processor 10 addresses the main memory array by a 24 bit address bus which includes an 8 bit high address and a 16 bit low address, the bus including latch 13a. Data is received and transmitted by way of a 16 bit data bus via buffers 13b. Buffers 14a and 14b provide for access by processor 10 to interprocessor address and data buses 16a and 16b respectively. Buffers 15a and 15b provide for access to S-Memory 12 from other processors via buses 16a and 16b respectively. Dual port controller 12a provides arbitration between requests for access to S-Memory 12 from processor 10 and any other processor via buses 16a and 16b.

Figure 2:
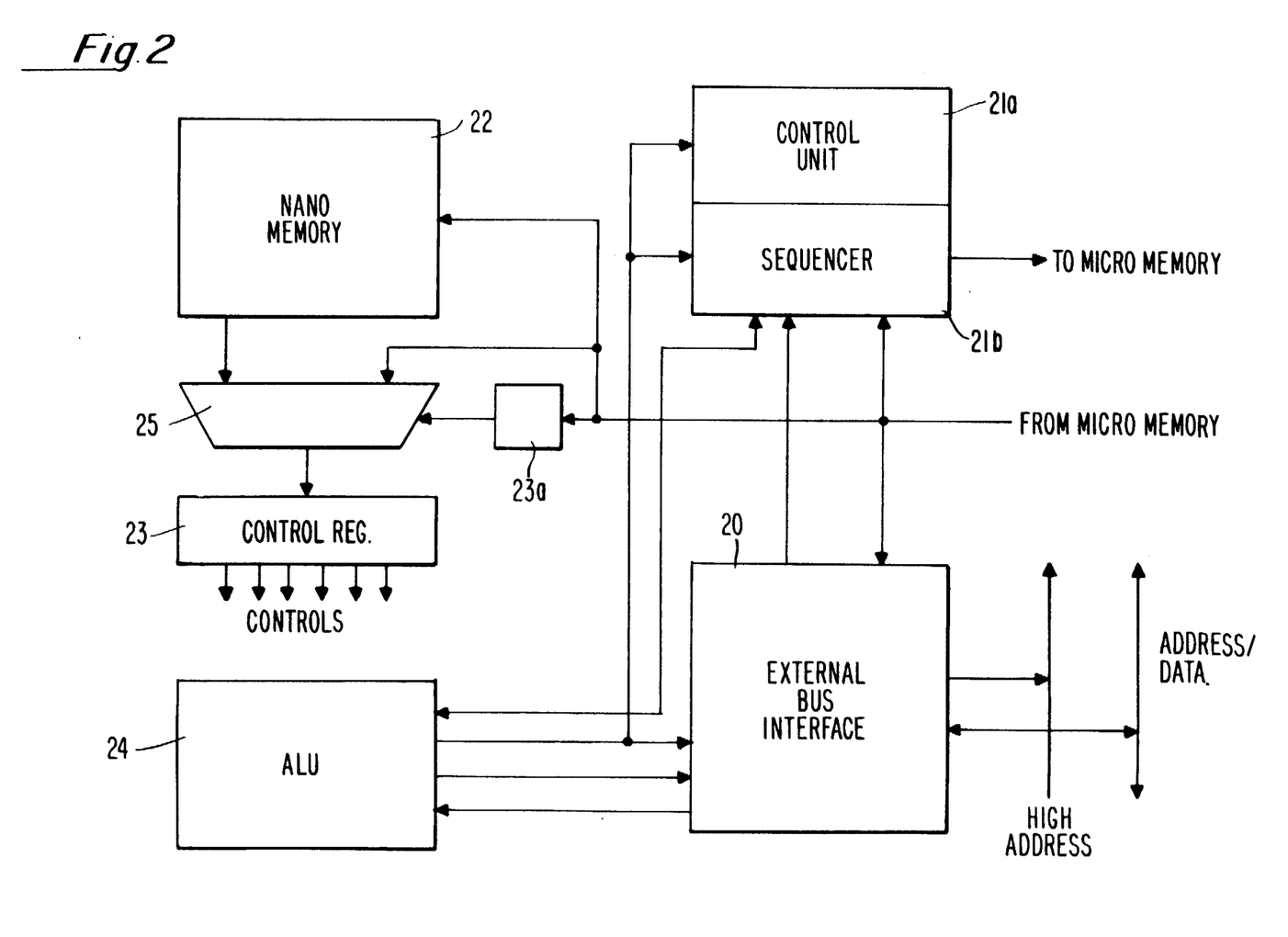
FIG. 2 is a diagram of the functional units in the processor of the present invention.

The processor of the present invention is illustrated in FIG. 2 and includes external bus interface 20 which can address main memory 12 of FIG. 1 by way of the high address bus and the address/data bus, the latter of which is a bidirectional bus. The processor receives data and machine instructions from main memory. The external bus interface, which will be described later in more detail, sends portions of machine instruction operators to sequencer 21b. Sequencer 21b uses that operator to address micro memory 11 of FIG. 1. In response thereto, micro instructions are received which are returned to control unit 21a, and other units, with a portion thereof being used as an address to nano memory 22, as will be more fully described below. As indicated in FIG. 2, and as described above, one type of such micro instruction might be a nano instruction which is supplied directly to control register 23. Whether the nano instruction comes from nano memory 21 or from micro memory 11 of FIG. 1, its various fields as they reside in control register 23 are then sent to arithmetic logic unit 24 and the other functional units of the processor to effect a particular operation.

Decoder 23A detects whether the incoming micro instruction is a type I or a type III micro instruction. If it is the former, its nano memory address is sent to nano memory 22. If the micro instruction is type III, it is sent directly to control register 23. Decoder 23A detects the type and signals multiplexor 25 whether to receive the output of nano memory 22 or the input from the micro memory for transfer to control register 23.

The various types of micro instructions are illustrated in FIGS. 3A-D. The first 4 bits, starting from the left, are employed to indicate the micro instruction type. In a type I micro instruction of FIG. 3A, the next 39 bits contain sequence information, a nano address, external operation information and a literal value. Bits 43 through 47 of all types of micro instructions are used to address the B-register file of the arithmetic logic unit that will be more fully described below and bit 48 is a parity bit.

Figure 3A:
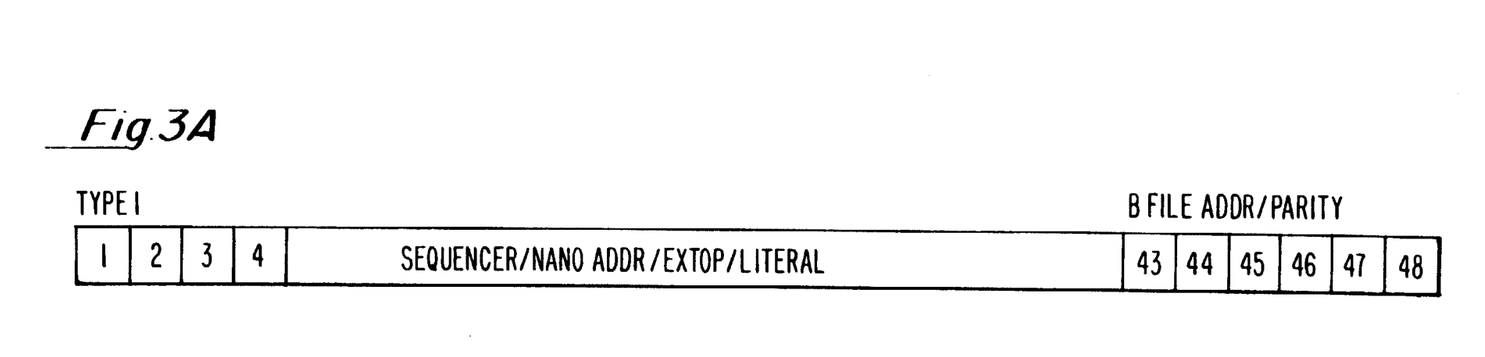
FIGS. 3A-D represent the formats and various types of micro instructions employed in the present invention.
Figures 3B, 3C:
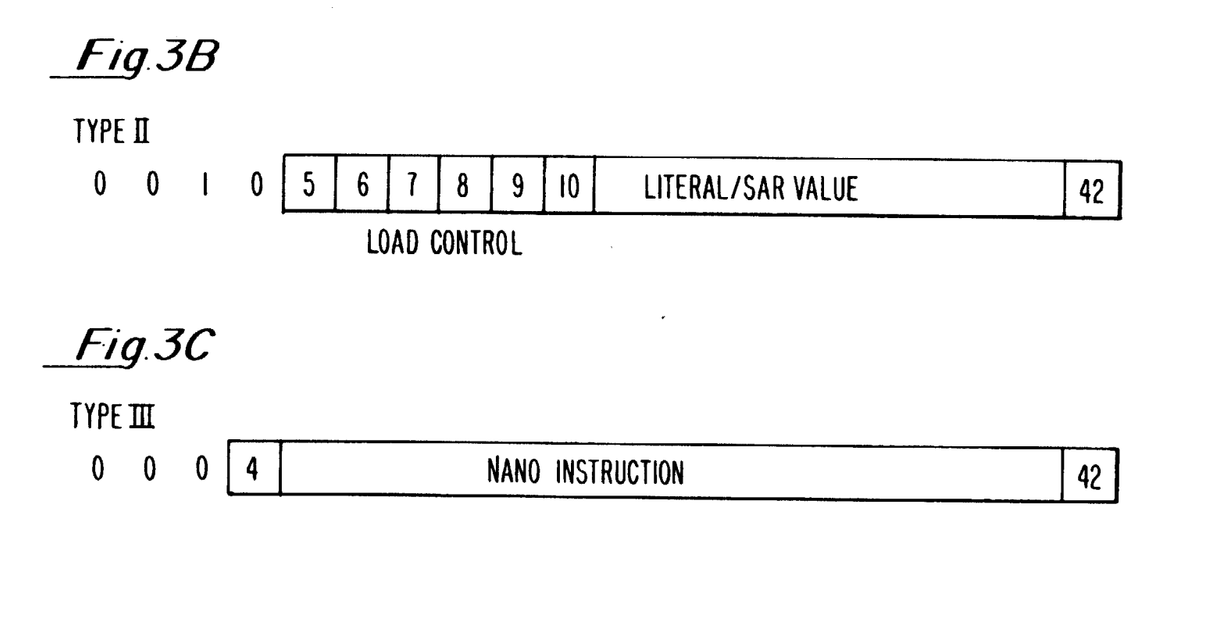

FIG. 3B illustrates a type II micro instruction which is employed primarily to supply literal values and shift amount register values to the arithmetic logic unit. Again, the first four bits indicate the type of micro instruction, the next six bits are load control information, the next 32 bits are either the literal or shift amount value and again bits 43 through 47 are a B-register file address and bit 48 is a parity bit.

The type III micro instruction contains as part of its contents a nano instruction as was described above. In this case, the first three bits specify the instruction type and the next 39 bits are the nano instructions. Again, bits 43 through 47 are a B-register file address and bit 48 is a parity bit.

Figure 3D:
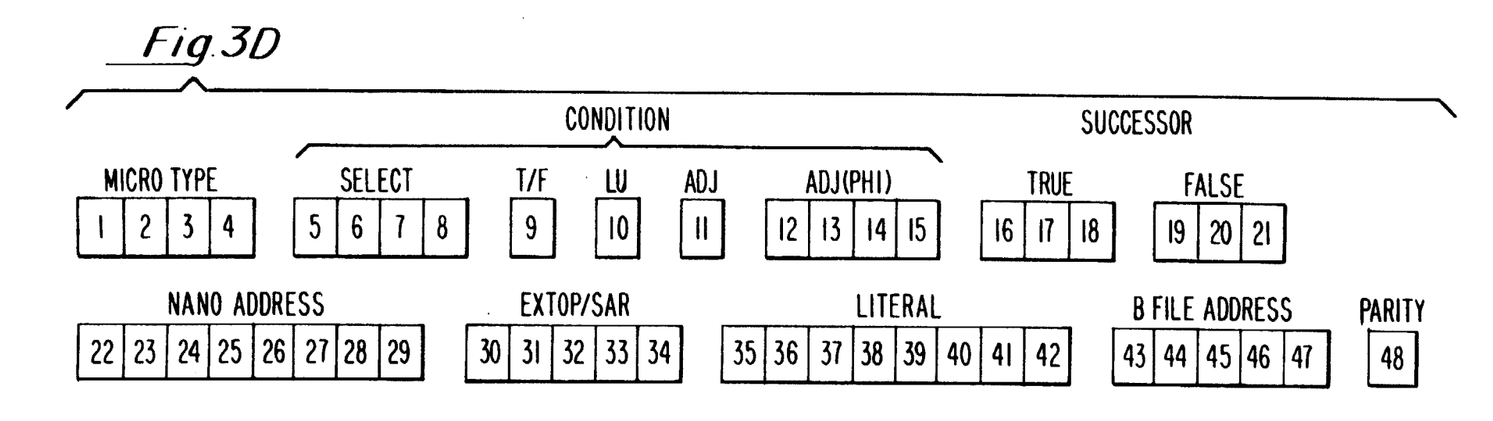

A type I micro instruction is illustrated in more detail in FIG. 3D. As was indicated above all micro instructions are 48 bits in width. In FIG. 3D, the first four bits indicate the micro type. Bits 5 through 15 are condition bits with bits 5 through 8 indicating the condition that is to be tested, such as adder overflow, and so forth. Bit 9 indicates whether that condition is to be tested to be true or false. Bit 10 indicates whether an arithmetic logic unit operation is conditional or unconditional and bits 11 and 12 through 15 indicate whether there is to be a condition adjustment and if the operation is to be conditional. These condition bits are sent dynamically to control unit 21a of FIG. 2.

Continuing on with the type I format of FIG. 3D, bits 16-18 and 19-21 are sent to sequencer 21b of FIG. 2 and indicate the source of the successor micro instruction address depending upon whether the selected condition tested is true or false.

Bits 22-29 are an 8 bit nano address which is supplied by the type I micro instruction to nano memory 22 of FIG. 2 and can select any one of 256 nano instructions. Bits 30-34 are sent dynamically to external bus interface 20 and control unit 21a of FIG. 2 and specify either an external operation or a value to be loaded into the shift amount register. Bits 35 through 42 represent a literal value and are either sent to the literal register to be discussed in relation to control unit 21a or as a branch address to be sent to sequencer 21b of FIG. 2. As indicated above, bits 43-47 represent a B-register file address in the arithmetic logic unit and bit 48 is a parity bit.

Figure 4:
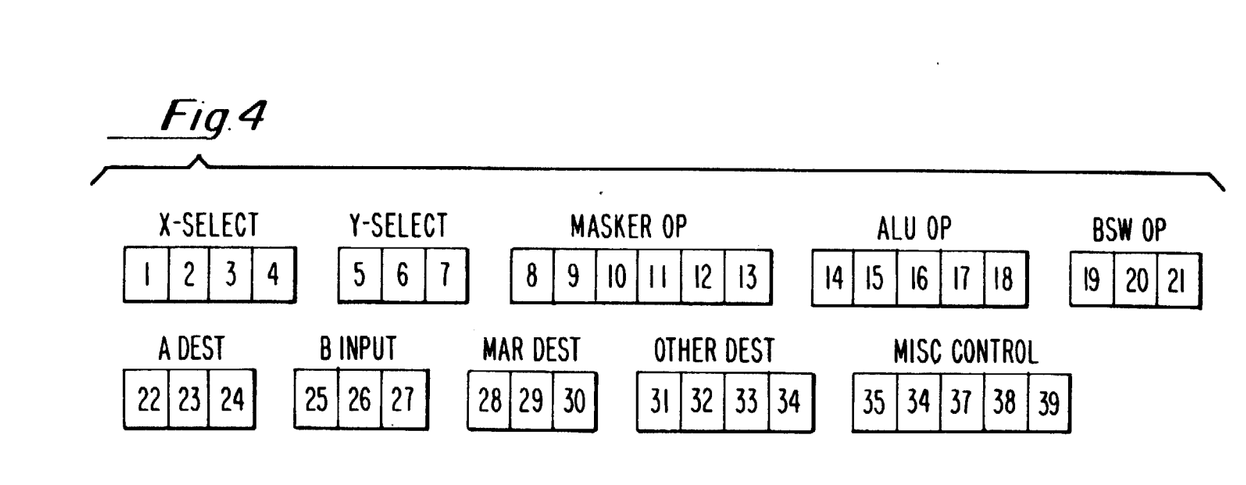
FIG. 4 is a representation of the format of the nano instruction as employed in the present invention.

FIG. 4 illustrates the format of a nano instruction which is received by control register 23 either from nano memory 27 of FIG. 2 or from micro memory 11 of FIG. 1 when a type III micro instruction is employed. As was indicated above, this nano instruction is made up of groups of encoded control signals which are subsequently decoded to produce the actual control signals. They are encoded to reduce the size of the nano memory. Since these various fields control different operations in the arithmetic logic unit, which will be more thoroughly discussed below, this discussion will cross reference the various fields of nano instruction and the units they operate in the arithmetic logic unit. However, the format of the nano instruction is being described now to provide a better understanding of the relationship between a nano instruction and the various units of the processor of FIG. 2.

Figure 5:
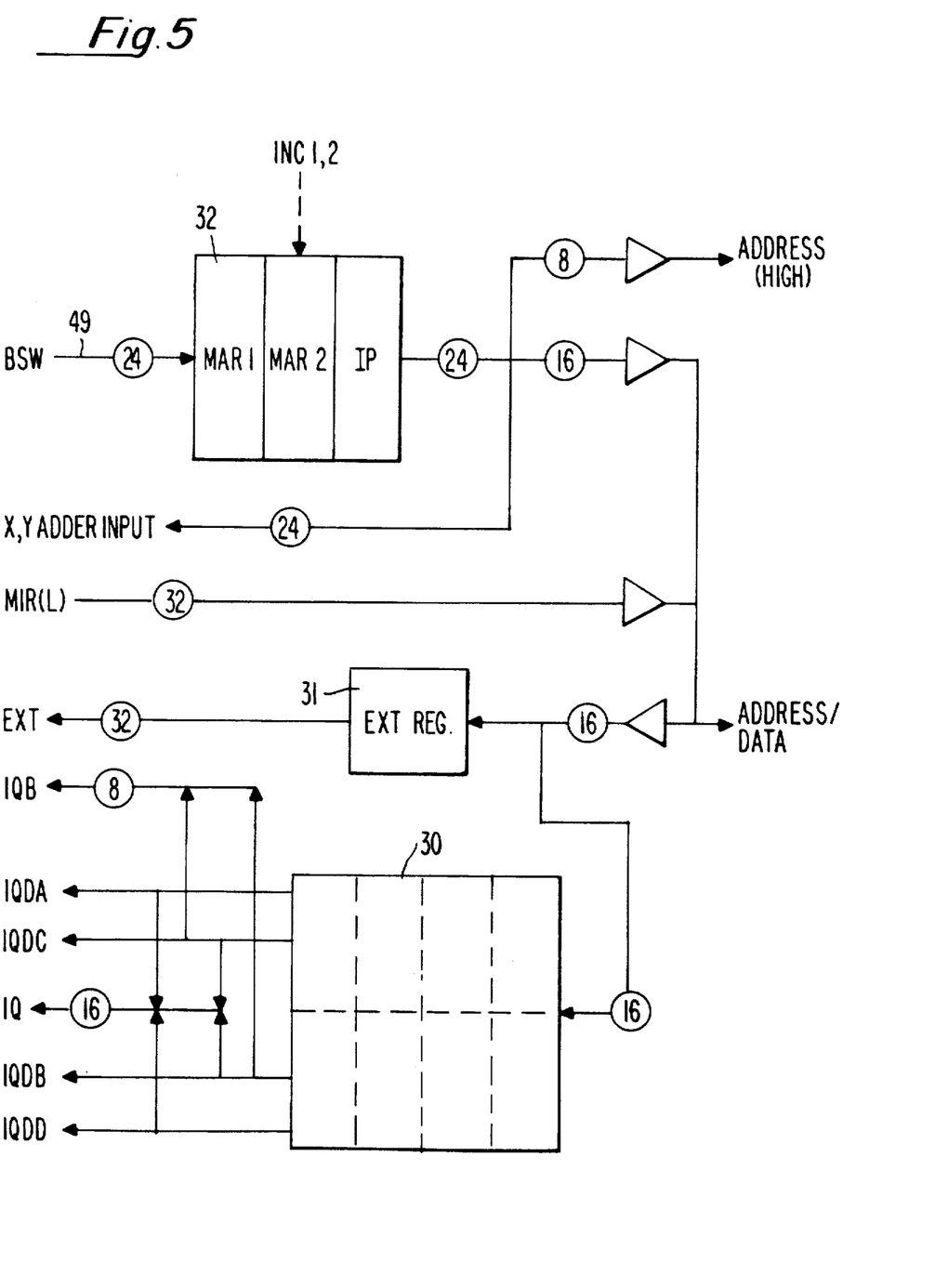
FIG. 5 is a schematic diagram of the external bus interface employed with the present invention.
Figure 6:
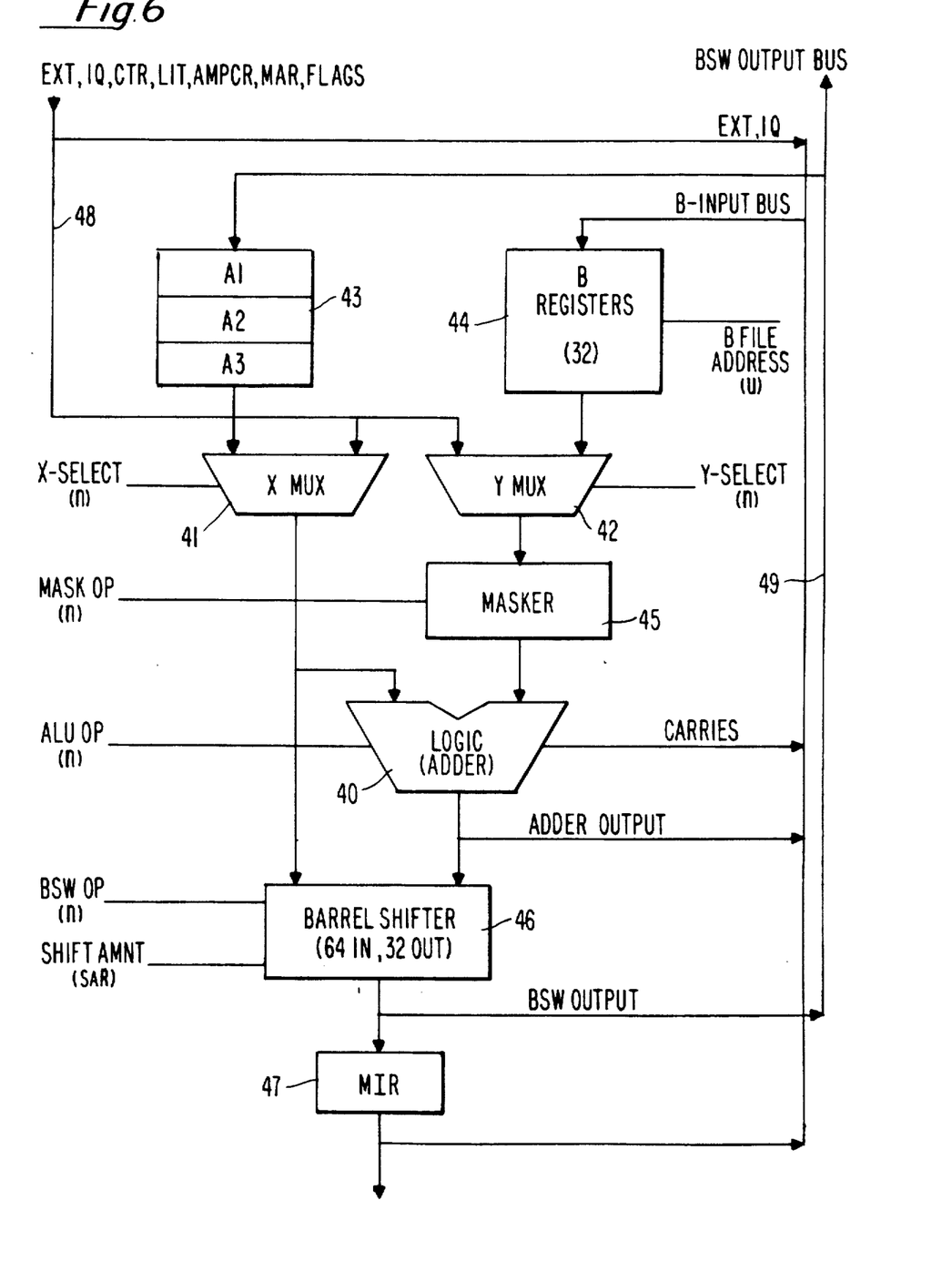
FIG. 6 is a schematic diagram of the arithmetic logic unit employed in the present invention.

The first four bits of the nano instruction of FIG. 4 indicate the source for the x input to logic unit 40 of FIG. 6. Bits 5 through 7 indicate the source to the y input to logic unit 40. Bits 8 through 13 indicate the type of operation to be provided by the masker unit 45 of FIG. 6 between the y input and the logic unit 40. Bits 14 through 18 specify the operation to be performed by the logic unit. Bits 19 through 21 indicate the operation to be performed by the barrel shifter 46 of FIG. 6 which can shift the output of logic unit 40 right, left, end around, and so forth, or simply pass that data on through. Bits 22 through 24 indicate which one of the A registers 43 of FIG. 6 is to receive data. Bits 25 through 27 indicate the source of the input to B-register file 44, FIG. 6. Bits 28 through 30 indicate which memory address registers 32 of FIG. 5 are to receive data. Bits 31 through 34 are used to specify other destinations as may be required and bits 35 through 39 are miscellaneous control signals that will be further described below in regard to the other units of the processor.

DETAILED DESCRIPTION OF THE INVENTION

External bus interface 20 of FIG. 2 is shown in more detail in FIG. 5. Data is received from the address/data bus by external register 31 for transmission to ALU 24 of FIG. 2, and ALU results are transmitted to the address/data bus from the memory information register bus MIR(L).

Instructions are received from the address/data bus by instruction queue 30 which can hold up to four 16 bit instructions. As will further be discussed in regard to control unit 21a of FIG. 2, each 16 bit instruction is divided into four 4 bit fields IQDA, IQDC, IQDB, and IQDD. These respective fields are sent to control unit 21a to form B register file addresses or micro addresses as will be more thoroughly described below. In addition, IQDA and IQDB can be employed to form an 8 bit field which is also sent to control unit 21a to form a micro address and the entire 16 bit instruction IQ can be sent to the ALU.

S memory addresses are received from the barrel shifter or barrel switch output bus BSW 49 by memory address registers 32 which include three registers MAR 1 and MAR 2 as well as instruction pointer IP, each of which can be individually selected to transmit its contents to S memory 12 of FIG. 1 by way of an 8 bit address high bus and a 16 bit address bus as was described above in regard to both FIG. 1 and FIG. 2. The output of these registers can also be selected for transfer back to the X and Y adder inputs of ALU 24 of FIG. 2, and each register can be independently incremented by 1 or by 2.

Before describing the details of control unit 21a and sequencer 21b of FIG. 2, it might provide a better understanding to first describe the functional units of ALU 24 of FIG. 2 which are controlled by nanoinstructions of control register 23 of FIG. 2 with the sequence of such nanoinstructions being determined by the sequencer 21b and control unit 21a. ALU 24 of FIG. 2 is shown in more detail in FIG. 6.

In FIG. 6, logic unit 40 can receive data inputs from a variety of sources, designated as bus 48 or the A register file 43 and the B register file 44 by way of X multiplexor 41 and Y multiplexor 42 respectively. The output of Y multiplexor 42 is supplied to logic unit 40 by way of masker unit 45 for reasons that are more thoroughly described below. The output of logic unit 40 as well as the output of X multiplexor 41 are supplied to barrel shifter 46. As was explained above, barrel shifter 46 can shift left or right and end around any number of bits positions as determined by the shift amount amount value specified by the shift amount register as was described in relation to FIG. 3D. The output of barrel shifter 46 is supplied to memory information register 47 and also to barrel shifter output bus (BSW) 49 for transmission either to external bus interface 20 of FIG. 2 and also control unit 21a and sequencer 21b of FIG. 2.

The respective B register to be used is determined by the B file address of the previous microinstruction and the other units are under the control of control fields of a nanoinstruction a described in relation to FIG. 4. Thus, the X-Select, Y-Select, masker operations, ALU operations and barrel switch operations are determined by control fields that were described in relation to FIG. 4.

All data path widths in FIG. 6 are 32 bits wide although units of FIG. 6 can be used for a 16 bit wide data path width under microinstruction control.

Sequencer 21b of FIG. 2 will now be described in relation to FIG. 7. This sequencer iterates the microaddresses which address micromemory 11 of FIG. 1 to retrieve either nanoinstructions or, when required, microinstructions which, among other things, address nanomemory 22 of FIG. 2 as was described above. Initially, the sequencing action starts by microprogram count register 50 (MPCR) being set to zero and upon initiation of an execute signal, its outputs are incremented by 1 by incrementer 51 and sent to the micromemory by way of next address multiplexor 56 and address latch 58. As S instructions are loaded into the instruction queue 30 of FIG. 4, the respective fields of those instructions are employed by control unit 21a of FIG. 2 to generate branch addresses which can either be supplied directly to next address multiplexor 56 or can be stored in alternate microprogram count register stack 54 by way of multiplexor 53. Alternate microinstruction addresses can also be entered into stack 54 from barrel switch output 49 (BSW) of FIG. 6. Stack 54 is a pushdown stack wherein the last address to be entered is the first address to be read out.

Various inputs to next address multiplexor 56 can either come from MPCR 50, that address incremented by one by incrementer 51 or incremented by 2 by incrementer 52, the output of AMPCR stack 54 either by way of incremeter 55 or directly, or from the branch address generator of control unit 21a of FIG. 2. Which of these inputs is selected for transmission to address latch 58 is determined by successor logic 57 which is activated by a condition signal from the current microinstruction and one of two 3 bit signals indicating whether a true successor or false successor is called for, which signals also come from the current type I microinstruction. Execution of microinstruction types other than type I causes an implicit selection of MPCR+1 as the next microinstruction address.

Figure 8:
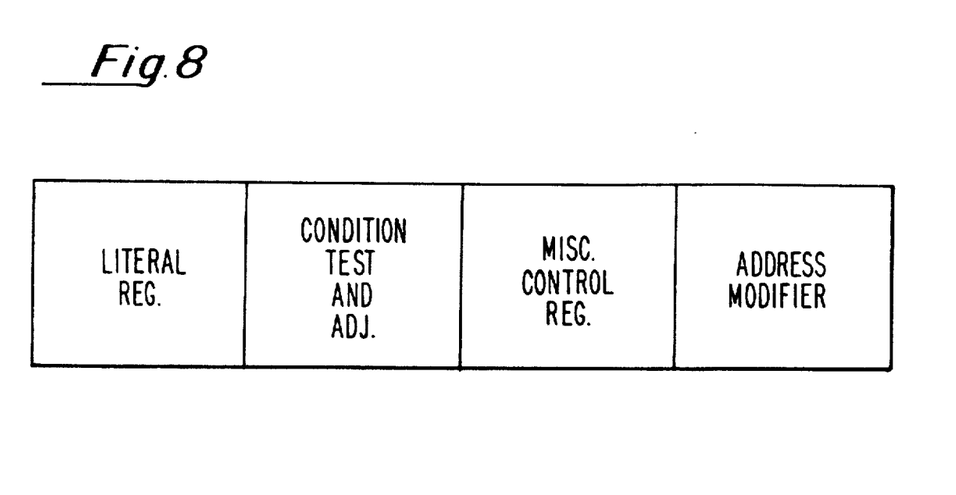
FIGS. 8, 8A-D are schematic diagrams of the various sections of the control unit of the present invention.

Control unit 21a of FIG. 2 is shown in detail in FIGS. 8A-D. FIG. 8 merely illustrates the four sections of the control unit which include the literal register, the condition test and adjust, miscellaneous control registers and address modifiers.

Figure 7:
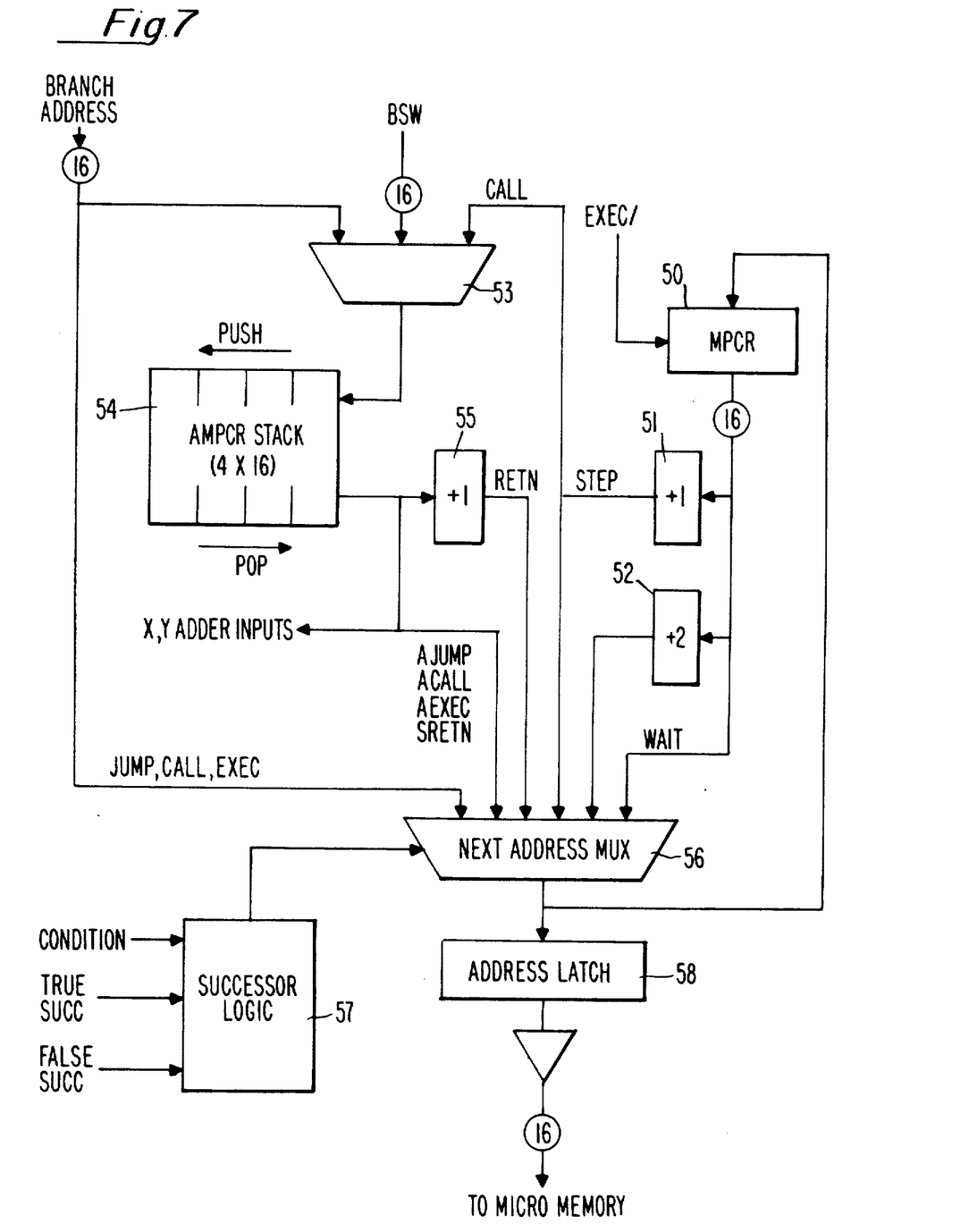
FIG. 7 is a schematic diagram of the sequencer of the present invention.
Figure 8A:
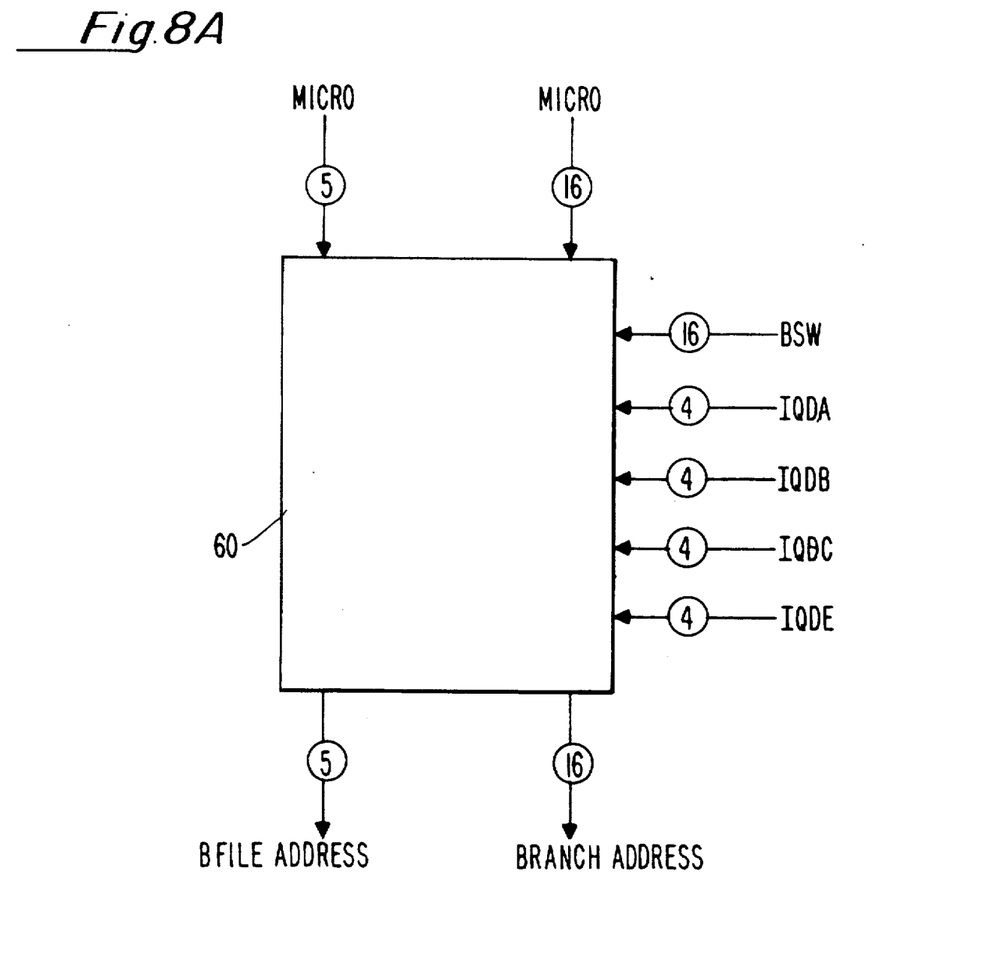

FIG. 8A is a block diagram of the logic which generates both the B file address for B register file 44 of FIG. 5 and also the branch address for sequencer 21b of FIG. 2 and FIG. 7. There are two inputs from the current type I microinstruction to this logic. One is the B file address which is 5 bits and also a 16 bit branch address, both of which come from the type I microinstruction of FIG. 3D. The B file address bits in that microinstruction are bits 43–47 and the 16 bit branch address is obtained from bits 30–42 and also 13, 14 and 15 when those fields are used to supply a branch address. Modifications to these inputs come from external bus interface 20 of FIG. 2 which is shown in detail in FIG. 5, or from the least significant 16 bits of barrel switch output bus 49 of FIG. 6. Four bit fields IQDA, IQDB, IQDC and IQDD and BSW output 49 are used to modify B register file addresses and/or microinstruction branch addresses supplied by the current type I microinstruction. The concatenation of IQDA and IQDB is used to modify microinstruction branch addresses supplied by the current type I microinstruction.

Figure 8B:
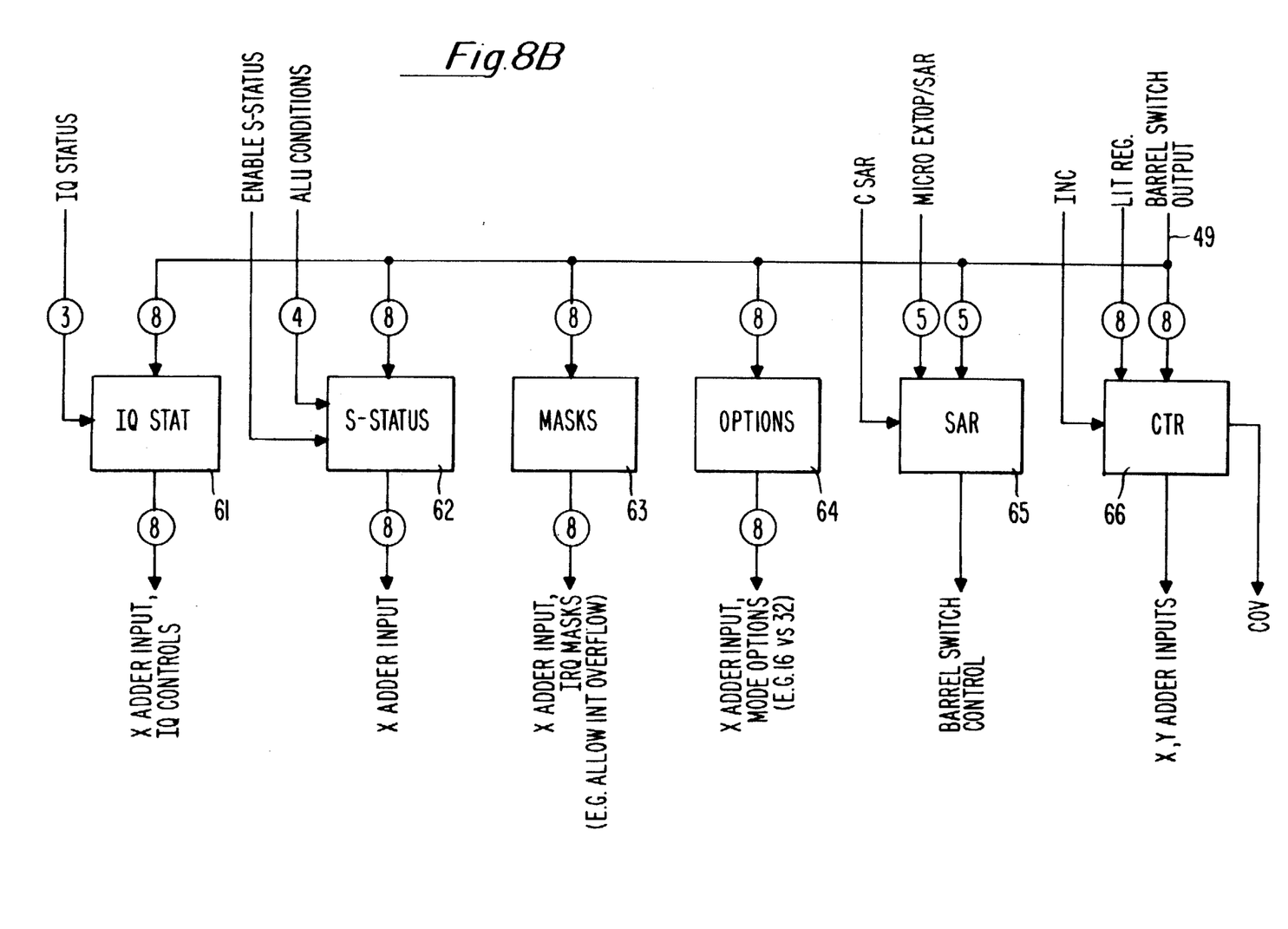

FIG. 8B illustrates the miscellaneous control registers, all of which can be loaded from barrel shift output 49 of FIG. 6 with values generated by logic unit 40. Some of these registers can be loaded from other sources, and perform specific functions, as will now be described.

IQ status register 61 receives a 3 bit IQ status signal which indicates the number of bytes in the instruction queue of external bus interface of FIG. 5. As indicated above, it also receives values generated by the logic unit 56 of FIG. 6 and its output goes both to the X adder input and to the IQ controls.

S status register 62 receives an enable S status signal from the miscellaneous field of the nanoinstruction format of FIG. 4 and also receives 4 bits representing ALU conditions which result from an ALU operation.

Mask register 63 enables certain status conditions to become an interrupt request signal.

Options register 64 receives among other things literal values from either a type I or type II microinstruction which literal values come from the literal register to be described below and are supplied to options register 64 by way of the ALU and barrel switch output bus 49. Its output goes to the X adder input and to certain control logic elements to enable specific operating modes.

Shift amount register 65 receives a shift amount value from the logic unit by way of barrel switch output 49 but also can receive shift amount values from the shift amount field of a type I or type II microinstruction of FIGS. 3D and 3B and counter 66 can receive values from barrel switch output 49 and also from the literal register to be discussed below in regard to FIG. 8D.

Figure 8C:
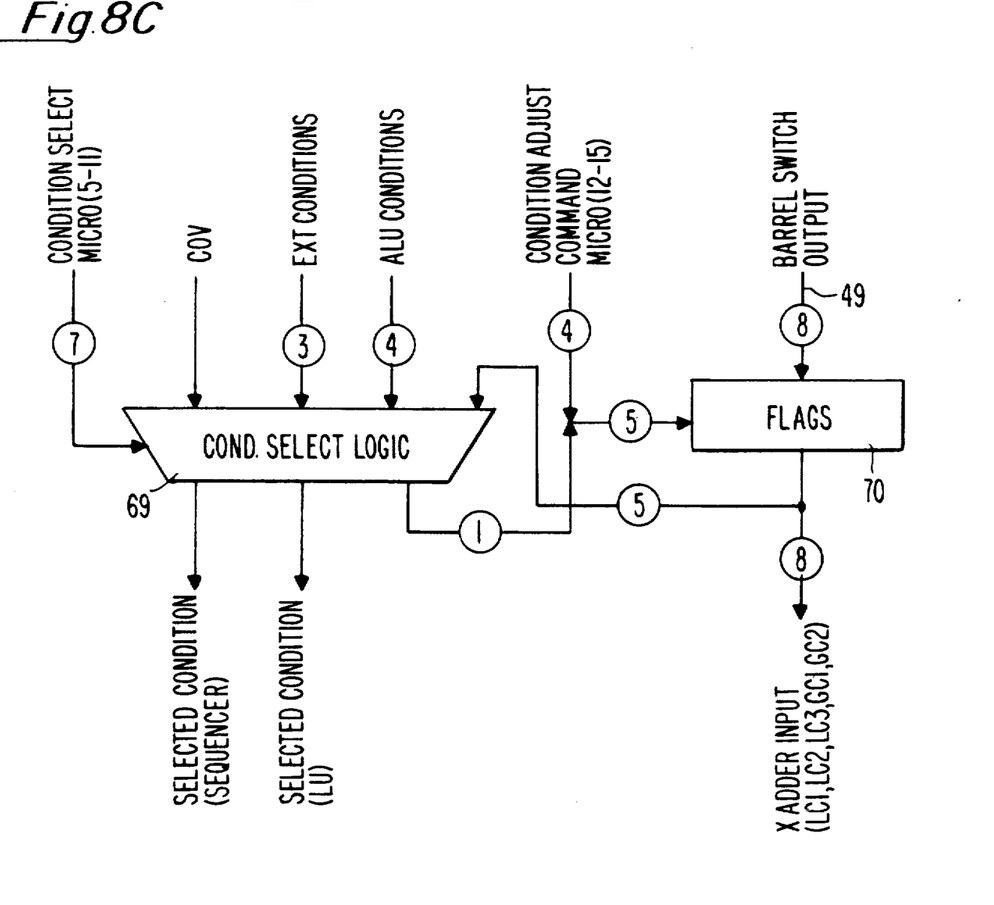

FIG. 8C shows the condition select logic 69 and flag register 70. Condition select logic 69 receives input from counter overflow output of counter 66 of FIG. 8B as well as various external conditions, ALU conditions and certain bits of the flags register 70. Combinations of these signals are selected by the condition select field, bits 5-11, of a type I microinstruction and outputs the selected conditions to sequencer 21b of FIG. 2, ALU 24 of FIG. 2 and to the flag register 70 to modify the value of certain bits of the flags register in accordance with the condition adjust command from a type I microinstruction, bits 12-15, of FIG. 3D.

Flags register 70 receives as its input signals generated by logic unit 40 of FIG. 6. The value of the bits of the flags register is adjusted according to the condition adjust command described above.

Figure 8D:
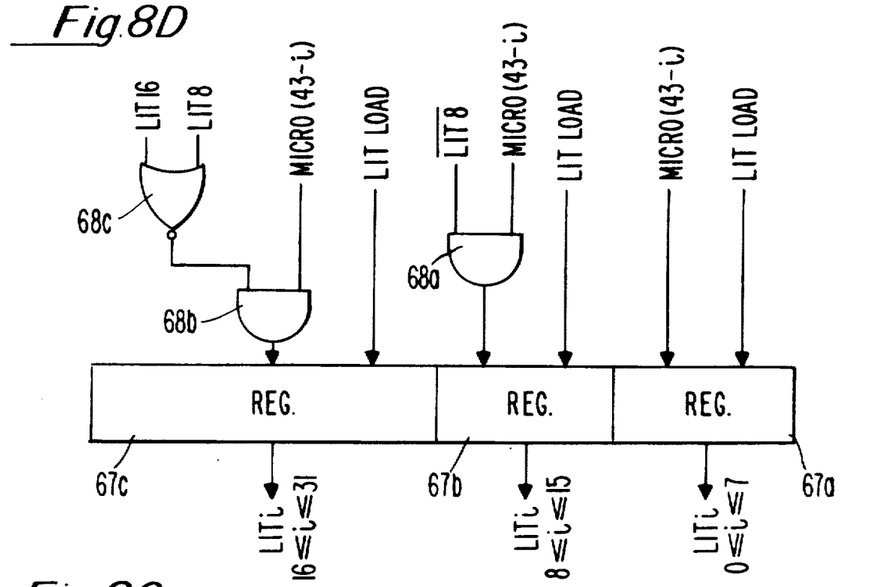

FIG. 8D illustrates the literal register in control unit 21a of FIG. 2 which can receive 8 and 16 bit literal values from a type I microinstruction of FIG. 3D as well as a 32 bit literal value from a type II microinstruction as illustrated in FIG. 3B. To this end, register 67a and register 67b are each 8 bit registers while register 67c is a 16 bit register.

In addition to the functions and various operations that have been described above, the present invention features two operations that are particularly useful in providing the flexibility of the processor of the present invention. As was indicated above, one of these features is the ability of the arithmetic logic unit of FIG. 6 to employ either a 32 bit or 16 bit data path width under program control. The manner in which this is done is that the programmer loads literal register of FIG. 8D with the appropriate value to indicate whether a 16 bit bus or 32 bit bus is to be employed. This is done with a type I microinstruction which is followed by a type III microinstruction or nanoinstruction which transfers the value of that literal register by way of the logic unit and the barrel switch output bus to options register 64 of FIG. 8B. This affects the logic unit's most significant bit condition and carry out and the all-zeroes and all-ones detection logic. The barrel switch operation is also affected, since end around shifting is different in 16-bit and 32-bit modes. Another feature of the present invention is the ability of the arithmetic logic unit to isolate different fields in one clock time. This is achieved by supplying the data word employing field to be isolated to the Y multiplexor 42 of FIG. 6 and to masker unit 45 which, under control of the current nanoinstruction, masks out that portion of the data word to the left of the field to be isolated. The remaining portion of the data word is applied to the barrel shifter 46 by way of logic unit 40 where it is shifted to the right end off to remove that portion of the data word to the right of the desired field to be isolated.

EPILOGUE

A microprogrammed processing system has been described which employs two levels of sub-instruction sets, namely microinstructions which are used either to address a nanoinstruction memory or control store of the processor or to supply such a nanoinstruction directly to the control register of the processor. In this manner, only a limited number of nanoinstructions need be stored in a read only memory within the processor that is placed on an integrated circuit chip. This allows for further utilization of the chip to include a 32 bit data bus processor and achieve other functions. Under microprogram control, the processor can be placed in either a 32 bit data bus or 16 bit data bus mode and the processor is also provided with a masker unit and barrel shifter unit that can isolate a field in a data word in one clock time.

Although one embodiment of the present invention has been described, it will be apparent to those skilled in the art that variations and modifications may be made therein without departing from the spirit and the scope of the invention as claimed.

What is claimed is:

1. A processing system including an arithmetic logic unit having various functional units, said system comprising:
    a first level subinstruction storage means;
    a second level subinstruction storage means; and
    a control register;
    said first level subinstruction storage means containing sequences of first level subinstructions some of which include an address to said second level subinstruction storage means, said sequences also including other first level subinstructions which contain control signals;
    said second level subinstruction storage means containing second level subinstructions having control signals contained therein;
    said control register being coupled to said first level subinstruction storage means and said second level subinstruction storage means to receive control signals from one or the other of said storage means according to certain selected bits in a current first level subinstruction, said control register further being coupled to said arithmetic logic unit to supply said control signals to said various functional units of said arithmetic logic unit;
    said arithmetic logic unit also including data buses, all of which are n bits wide, said arithmetic logic unit further including means to select n bits of said data buses for use, or m bits of said data buses for use where m is less than n, said selected means being coupled to said control register to receive information as to whether m or n bits of said data buses are to be used.

2. A system according to claim 1 wherein:
    said arithmetic logic unit includes an adder unit coupled to said first level storage means to receive information as to whether a carry signal is to be generated when the output of said adder is to be m bits wide or n bits wide.

3. A processing system according to claim 2 wherein:
    said arithmetic logic unit includes shifting means coupled to a first level control store to receive information specifying whether such shifting means is to shift data end around by up to n bits or m+n bits.

4. A system according to claim 1 further including:
    decoder means coupled to said first level subinstruction storage means to receive the first set of bits in said first level subinstruction to determine whether said first level subinstruction includes an address to said second level storage or includes control signals; and
    multiplexing means coupled to said decoder means, said multiplexing means also being coupled to said first level subinstruction storage means and said second level subinstruction storage means to select one of said storage means to supply control signals to said control register.

5. A system according to claim 3 further including:
a control unit; and
memory means to store machine language instructions, said memory means being coupled to said control unit to supply said machine language instructions thereto;
said control unit including means to form first level subinstruction storage means addresses from said machine language instructions.

6. A system according to claim 5 further including:
sequencing means coupled to said control unit and to said first level subinstruction storage means to receive said first level subinstruction storage means addresses to address said first level subinstruction storage means.

7. A system according to claim 6 wherein:
said coupling between said memory means and said control unit includes an external bus; and
external bus interface means coupled between said external bus and said control unit;
said external bus being coupled to said memory means to receive said machine language instructions and data.

* * * * *